(12) United States Patent
Hsien

(10) Patent No.: US 9,240,889 B2
(45) Date of Patent: Jan. 19, 2016

(54) METHOD AND SYSTEM FOR SECURE DATA ACCESS AMONG TWO DEVICES

(71) Applicant: HTC Corporation, Taoyuan County (TW)

(72) Inventor: Chao-Chung Hsien, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 13/682,739

(22) Filed: Nov. 21, 2012

(65) Prior Publication Data

US 2013/0145171 A1 Jun. 6, 2013

Related U.S. Application Data

(60) Provisional application No. 61/565,955, filed on Dec. 1, 2011.

(51) Int. Cl.
| | |
|---|---|
| *H04L 29/06* | (2006.01) |
| *H04L 9/32* | (2006.01) |
| *G06F 21/57* | (2013.01) |
| *G06F 21/60* | (2013.01) |
| *H04L 9/08* | (2006.01) |
| *H04L 9/00* | (2006.01) |

(52) U.S. Cl.
CPC ............ *H04L 9/3247* (2013.01); *G06F 21/575* (2013.01); *G06F 21/606* (2013.01); *H04L 9/0866* (2013.01); *H04L 9/3226* (2013.01); *H04L 9/00* (2013.01); *H04L 9/0813* (2013.01)

(58) Field of Classification Search
CPC .............................. G06F 21/6209; G06F 21/60
USPC ................................ 726/26–30; 713/164–170
See application file for complete search history.

(56) References Cited

U.S. PATENT DOCUMENTS

| | | |
|---|---|---|
| 6,799,197 B1 | 9/2004 | Shetty |
| 6,975,727 B1 | 12/2005 | Vandergeest |
| 7,051,206 B1 | 5/2006 | Giest |
| 7,428,750 B1 | 9/2008 | Dunn |
| 7,552,333 B2 | 6/2009 | Wheeler |

(Continued)

FOREIGN PATENT DOCUMENTS

| | | |
|---|---|---|
| CN | 1731726 A | 2/2006 |
| CN | 101379506 A | 3/2009 |

(Continued)

OTHER PUBLICATIONS

Yandji et al, "Research on a Normal File Encryption and Decryption," Computer and Management (CAMAN), 2011 International Conference on Year: 2011, pp. 1-4.*

(Continued)

*Primary Examiner* — Roderick Tolentino
(74) *Attorney, Agent, or Firm* — Winston Hsu; Scott Margo

(57) ABSTRACT

An embodiment of the present invention provides a method for secure data access among two devices. The method comprises: retrieving unique information corresponding to a first electronic device and a storage device; generating an encryption key according to the unique information; generating a password string for secure a data file; encrypting the password string with the encryption key; and locking and storing the data file together with the encrypted password string in the storage device.

13 Claims, 7 Drawing Sheets

(56) References Cited

U.S. PATENT DOCUMENTS

| | | | |
|---|---|---|---|
| 7,681,048 B2 | 3/2010 | Starr | |
| 8,165,303 B1 | 4/2012 | Steele | |
| 8,301,884 B2 | 10/2012 | Choi | |
| 8,393,001 B1 | 3/2013 | Libenzi | |
| 8,452,969 B2 | 5/2013 | Iyer | |
| 8,527,618 B1 | 9/2013 | Wiese | |
| 2002/0073306 A1 | 6/2002 | Aluzzo | |
| 2002/0112161 A1 | 8/2002 | Thomas | |
| 2004/0111331 A1 | 6/2004 | Yano | |
| 2004/0123109 A1 | 6/2004 | Choi | |
| 2005/0097316 A1 | 5/2005 | Kim | |
| 2007/0214370 A1* | 9/2007 | Sato | H04N 7/1675 713/193 |
| 2007/0269042 A1* | 11/2007 | Tanaka | H04K 1/00 380/44 |
| 2008/0028209 A1 | 1/2008 | Dare | |
| 2008/0082813 A1 | 4/2008 | Chow | |
| 2008/0184218 A1 | 7/2008 | Largman | |
| 2008/0189550 A1* | 8/2008 | Roundtree | G06F 21/51 713/176 |
| 2008/0244271 A1 | 10/2008 | Yu | |
| 2010/0005304 A1 | 1/2010 | Maruyama | |
| 2010/0031034 A1* | 2/2010 | Kim | H04L 9/0825 713/165 |
| 2010/0050241 A1* | 2/2010 | Yan | G06F 21/10 726/5 |
| 2010/0250925 A1* | 9/2010 | Hiraide | G06F 21/6209 713/165 |
| 2010/0290076 A1* | 11/2010 | Itoh | G06F 21/34 358/1.14 |
| 2010/0332820 A1 | 12/2010 | Matsushima | |
| 2011/0002462 A1* | 1/2011 | Stewart | H04L 9/3271 380/46 |
| 2011/0021181 A1 | 1/2011 | Weiner | |
| 2011/0066859 A1 | 3/2011 | Iyer | |
| 2011/0093714 A1 | 4/2011 | Schaecher | |
| 2011/0274273 A1* | 11/2011 | Fiske | G06F 21/32 380/46 |
| 2011/0296174 A1* | 12/2011 | Nakayama | H04L 69/04 713/162 |
| 2012/0087493 A1 | 4/2012 | Chidambaram | |
| 2012/0240211 A1 | 9/2012 | Counterman | |
| 2012/0294445 A1* | 11/2012 | Radutskiy | H04L 9/083 380/278 |
| 2013/0117564 A1 | 5/2013 | Chang | |

FOREIGN PATENT DOCUMENTS

| | | |
|---|---|---|
| CN | 101398764 A | 4/2009 |
| CN | 102007505 A | 4/2011 |
| EP | 0 725 512 A2 | 8/1996 |
| TW | 200539706 | 12/2005 |
| TW | 200629085 | 8/2006 |
| TW | 200841187 | 10/2008 |
| TW | 200915183 | 4/2009 |
| TW | 200951848 | 12/2009 |
| TW | 201021500 | 6/2010 |
| TW | 201108699 | 3/2011 |
| TW | 201110653 | 3/2011 |
| TW | 201137659 | 11/2011 |
| TW | 201141125 | 11/2011 |

OTHER PUBLICATIONS

Zugenmaier et al., "Transparent Encryption for External Storage Media with Key Management Adapted to Mobile Use," Computer Security Applications Conference, 2009. ACSAC '09. Annual Year: 2009 pp. 333-339.*

Office action mailed on Jun. 16, 2014 for the Taiwan application No. 101144442, filing date Nov. 28, 2012, p. 1-9.

Office action mailed on Dec. 29, 2014 for the Taiwan application No. 101144444, filing date Nov. 28, 2012, p. 1-9.

Office action mailed on Mar. 2, 2015 for U.S. Appl. No. 13/682,752, filed Nov. 21, 2012, p. 1-25.

Office action mailed on Sep. 24, 2014 for U.S. Appl. No. 13/674,068, filed Nov. 11, 2012, p. 1-17.

Office action mailed on Feb. 2, 2015 for the China application No. 201210510215.9, filing date Dec. 3, 2012, p. 1-13.

Notice of Allowance mailed on Jan. 28,2015 for the Taiwan application No. 101144442, filing date: Nov. 28, 2012, p. 1-5.

Office action mailed on Jul. 27, 2015 for U.S. Appl. No. 13/682,752, filed Nov. 21, 2012, p. 1-16.

Office action mailed on May. 29, 2015 for the China application No. 201210511241.3, filing date Dec. 3, 2012, p. 1-6.

Notice of Allowance mailed on Nov. 16, 2015 for the U.S. Appl. No. 14/686,752, filed Apr. 14, 2015, p. 1-20.

* cited by examiner

METHOD AND SYSTEM FOR SECURE DATA ACCESS AMONG TWO DEVICES

CROSS REFERENCE TO RELATED APPLICATIONS

This application claims priority of U.S. Provisional No. 61/565,955 filed on Dec. 1, 2011.

BACKGROUND OF THE INVENTION

1. Field of the Invention

The present invention relates to method and system for secure data access among two devices, and more particularly, to methods and system for secure password generation.

2. Description of the Prior Art

Currently, data security is an important topic for keeping data protected from unauthorized access in order to ensure privacy of personal or sensitive data. One simple way to protect data is to lock the data with a password. For example, a user can operate a mobile device to run a data compression application program for compressing a sensitive file and locking the sensitive file with a password determined by the user, such that the locked file can be further stored and protected in a memory card safely. However, the password could be easily cracked, or the user may forget the password if the password is too complicated. Therefore, a protection mechanism for protecting the password securely and effectively is very helpful to the user.

SUMMARY OF THE INVENTION

An embodiment of the present invention provides a method for secure data access among two devices. The method comprises: retrieving unique information corresponding to a first electronic device and a storage device; generating an encryption key according to the unique information; generating a password string for securing a data file; encrypting the password string with the encryption key; and locking and storing the data file together with the encrypted password string in the storage device.

Another embodiment of the invention provides data security system. The data security system comprises: a processing unit, configured to process a data file, the processing unit comprising: a key generator, configured to generate an encryption key according to unique information corresponding to the storage device and the processing unit; a password generator, configured to generate an encrypted password string according to the encryption key; and a storage unit, configured to store the data file and the encrypted password string.

Yet another embodiment of the invention provides a method for secure data access, comprising: receiving a request, by a processing unit, for accessing a secured data file stored in a storage unit; retrieving unique information corresponding to the processing unit and the storage unit respectively; generating a decryption key according to the unique information; decrypting the secured data file according to the decryption; and permitting access to the secured data file according to the decryption result.

These and other objectives of the present invention will no doubt become obvious to those of ordinary skill in the art after reading the following detailed description of the preferred embodiment that is illustrated in the various figures and drawings.

DETAILED DESCRIPTION

The invention discloses system and method for secure data access among two devices according to unique information of the two devices. To protect a data file, a password may be generated in random and further encrypted by a key. The key is derived from the unique information of the two devices, and thus it avoids the password from being decrypted by unauthorized devices. The data file will be locked by the password and may be stored together with the encrypted password. In order to access the locked data file, the encrypted password must be decrypted first so as to provide protection.

Figure 1:
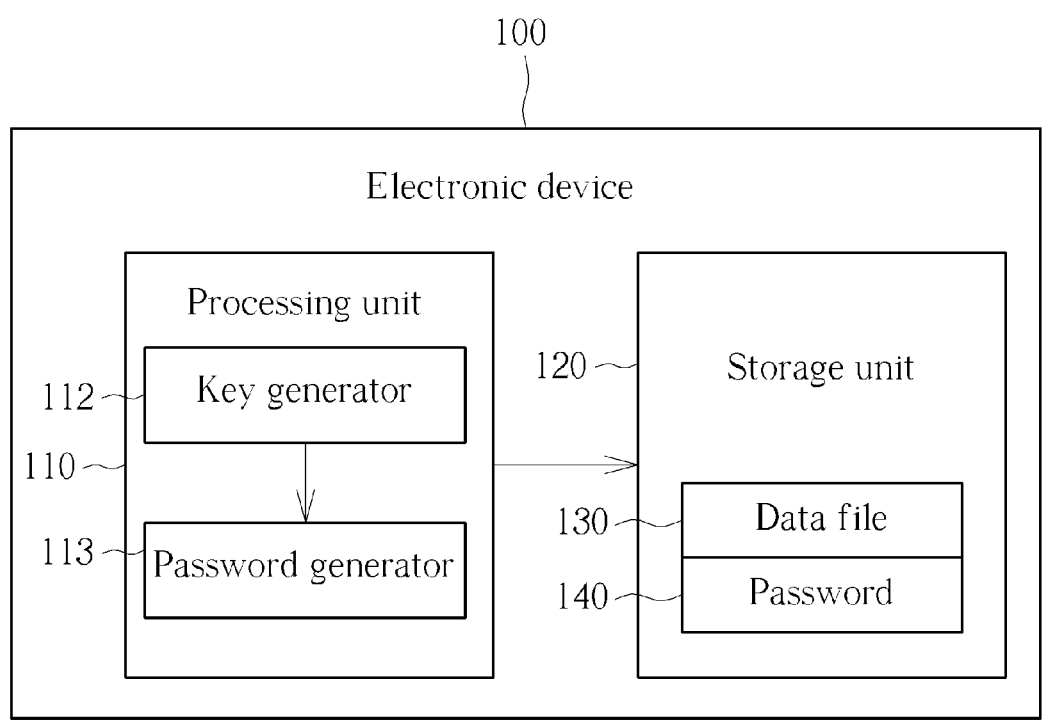
FIG. 1 depicts a diagram of secure password generation for use in an electronic device according to an embodiment of the invention

Please refer to FIG. 1, which depicts a diagram of secure password generation for use in an electronic device according to an embodiment of the invention. In this embodiment, the electronic device 100 comprises, among other components/units, a processing unit 110 and a storage unit 120. The processing unit 110 is configured to process a data file 130 and comprises at least a key generator 112 and a password generator 113. The processing unit 110 is configured to process the data file 130 by protecting the data file 130 with secure password prior to transmitting and/or storing the data file 130 into the storage unit 120 or other storage device. The key generator 112 of the processing unit 110 is configured to produce a key for encrypting a password according to some unique data of the processing unit 110 and/or the storage device 120 wherein the data file 130 is going to be stored, for example the storage unit 120 in this embodiment. The password generator 113 receives the key generated by the key generator 112 and is configured to generate a secure password 140 associated with the data file 130 according to the key. The secure password 140 together with the data file 130 that is locked by the password are then transmitted and stored into the storage unit 120. In one embodiment of the invention, the data file 130 may be further compressed for storage. The processing unit 110 may further comprises a data access interface unit (not shown) configured to receive a request for accessing the data file.

The processing unit 110 may be a central processing unit, application processor, dedicated processor, and/or other similar devices. The storage unit 120 may be an internal storage unit such as embedded multimedia card (eMMC), SATA hard disk, PCIE hard disk, flash memory and/or others. The storage unit 120 may also be a storage unit external to the electronic device 100, such as SD card, Micro SD card, USB memory, ROM, or any suitable type of external memory. Furthermore, the storage unit 120 may support hot-plug to the electronic device 100. In order to access the data file 130 from the storage unit 120, the secure password 140 has to be verified first.

Figure 2:
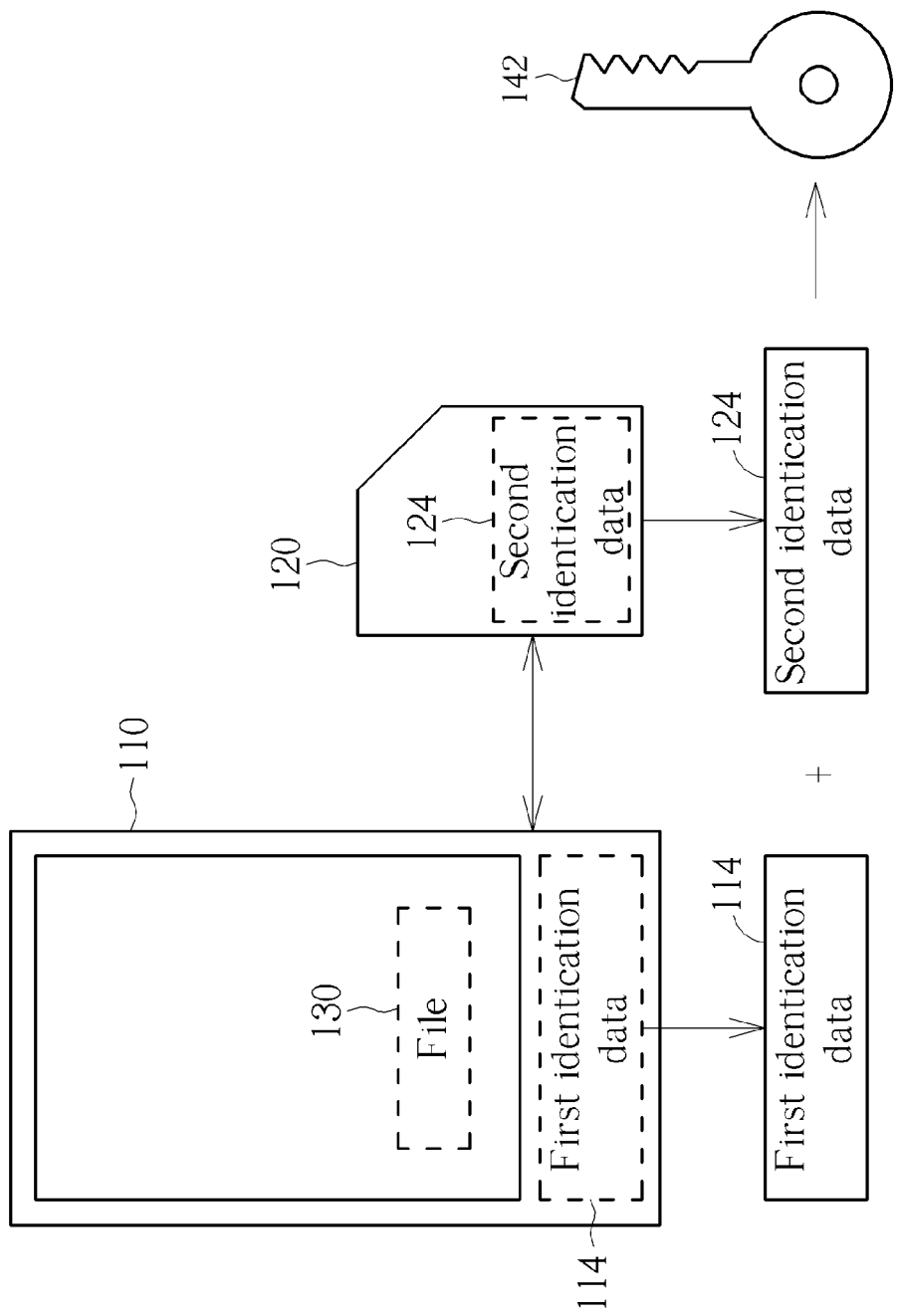
FIG. 2 illustrates an embodiment of the invention for secure password generation.
Figure 3:
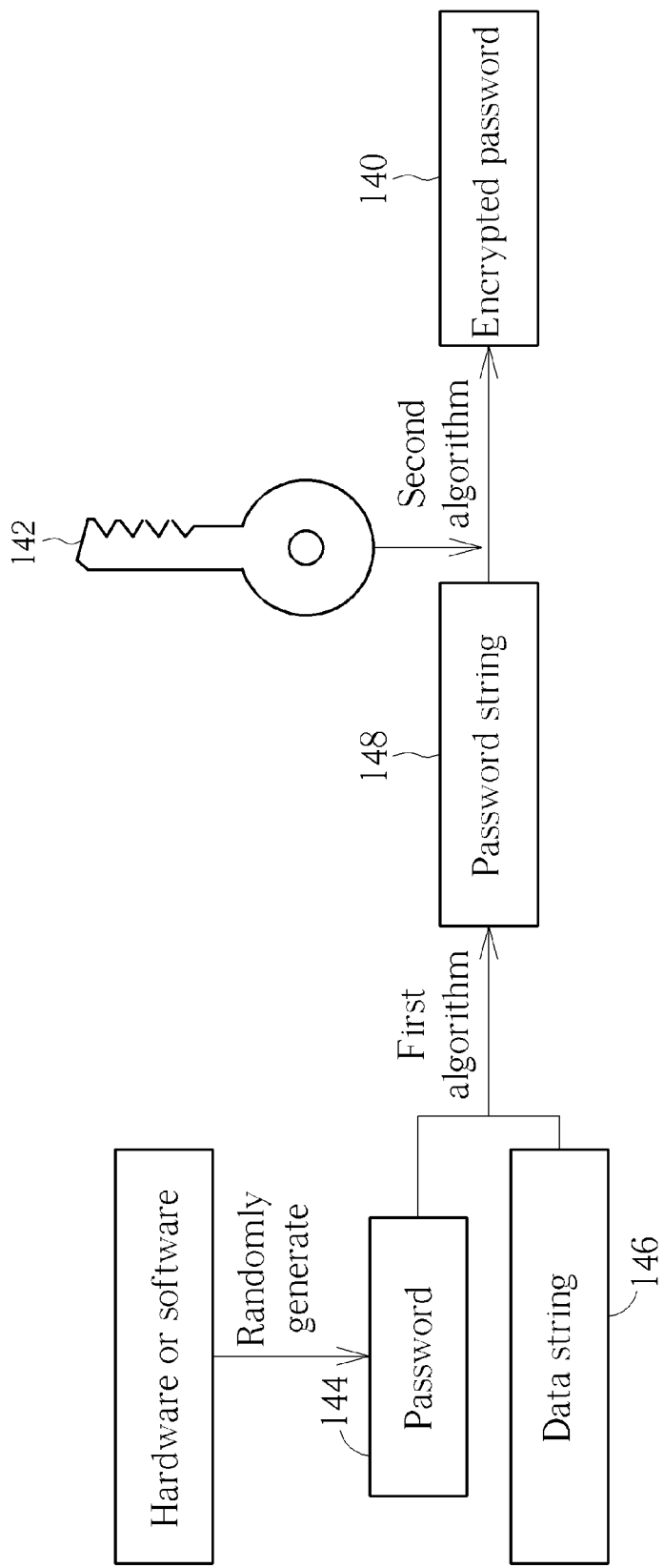
FIG. 3 illustrates another embodiment of the invention for secure password generation.

Next please refer to FIG. 2 and FIG. 3, in which illustrate embodiments of the invention for secure password generation. Prior to transmitting the locked data file 130 to the storage unit 120, the processing unit 110 generates a secure password according to unique information corresponding to the processing unit 110 and the storage unit 120. As shown in the embodiment of FIG. 2, the unique information is identification data 114, 124 of the processing unit 110 and the storage unit 120 respectively. The identification data can be, for example, device serial number, IMEI number, MAC address, and/or other similar information. The processing unit 110 may retrieve and/or store the second identification data 124 corresponding to the storage unit 120. Then the first identification data 114 of the processing unit 110 is processed together with the second identification data 124 for generating a key 142 according to a predefined algorithm. The key 142 may be generated by string combination and/or hash calculation. In one embodiment of the invention, the predefined algorithm may be a logic operation, such as an XOR operation. Result of the logic operation may further undergo a hash calculation to generate the key 142, such as SHA256. The processes of FIG. 2 may be performed by the key generator 112 of FIG. 1.

After the key 142 is generated, it can be further used to generate a secure password, for example an encrypted password string. Referring to FIG. 3, a password 144 may be generated in random by a hardware or software generator. The password 144 is then processed together with a data string 146 so as to generate a password string 148 according to a first algorithm. The data string may also be generated in random by a hardware or software generator. To provide better protection, the password 144 is scattered within the data string 146 so that the password 144 may be hidden. In one embodiment of the invention, the length (number of bits) of the data string 146 is longer than the password 144, for example 32 bytes of password 144 and 1024 bytes of data string 146. In one embodiment of the invention, the password string 148 may be generated by mixing the password 144 and the data string 146. For example, each bit or byte of the password 144 may be scattered into the data string 146 every predefined bit/byte interval. For example, insert the first byte of the password 144 in between the $32^{nd}$ and $33^{rd}$ bytes of the data string 146, insert the second byte of the password 144 in between the $64^{th}$ and $65^{th}$ bytes of the data string 146, and so on. In another embodiment of the invention, the password string 148 may be generated by replacing certain bit/byte of the data string 146 with individual bit/byte of the password 144 in a predefined order. For example, replace the first byte of the data string 146 with the first byte of the password 144, replace the $33^{rd}$ byte of the data string 146 with the second byte of the password 144, and so on. The password string 148 is then encrypted with the key 142 according to a second algorithm to generate an encrypted password string 140. The second algorithm may be any suitable encryption algorithm, such as SHA 265.

Figure 4:
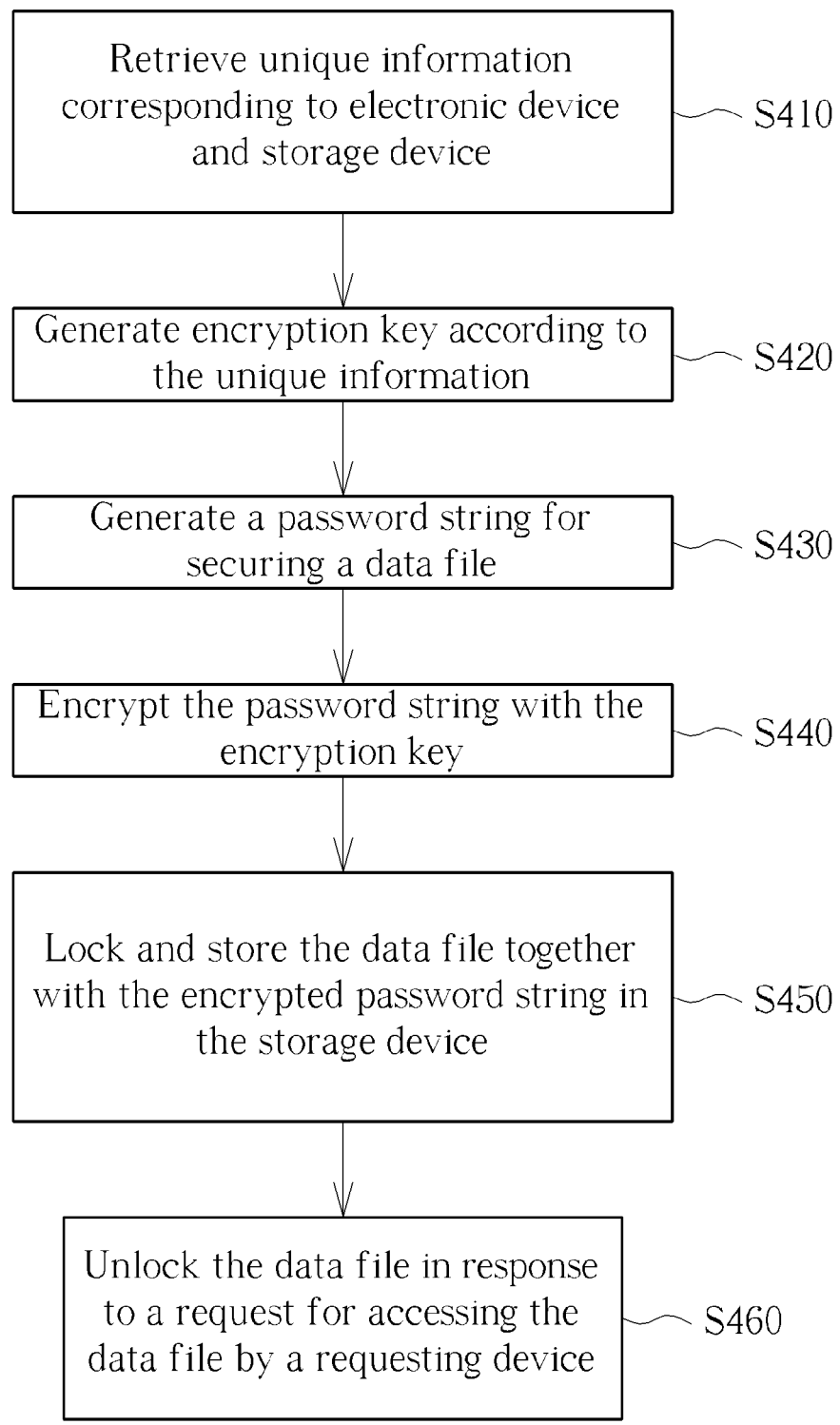
FIG. 4 illustrates a diagram of a method for secure data access according to an embodiment of the invention.

Having described above embodiments, FIG. 4 illustrates a diagram of a method for secure data access according to an embodiment of the invention. To protect data file to be stored or had been stored in a storage device, a secure password may be generated according to some secure information that can only be obtained by designated devices, and the data file may be locked by the password. The unique information may be identity information such as device serial number, IMEI number and/or MAC address, etc. In this method, unique information corresponding to an electronic device configured to process the data file and a storage device configured to store the data file is retrieved in step S410. An encryption key is generated according to the unique information in step S420, meanwhile a password string for secure the data file is generated in step S430. The password string may be generated in random and/or further processed by a predetermined algorithm. Step S440 encrypts the password string with the encryption key according to another predetermined algorithm. Then the data file is locked and stored in the storage device together with the encrypted password (S450). The storage device may be internal or external to the electronic device. Then in response to a request for accessing the data file by a requesting device, unlock the data file by decrypting the encrypted password. If the encrypted password can be successfully decrypted, the requesting device may access or unlock the data file. If not, the requesting device cannot access or unlock the data file. In another embodiment of the invention, the data file may further be decompressed if it is compressed when being stored in the storage device.

Figure 5:
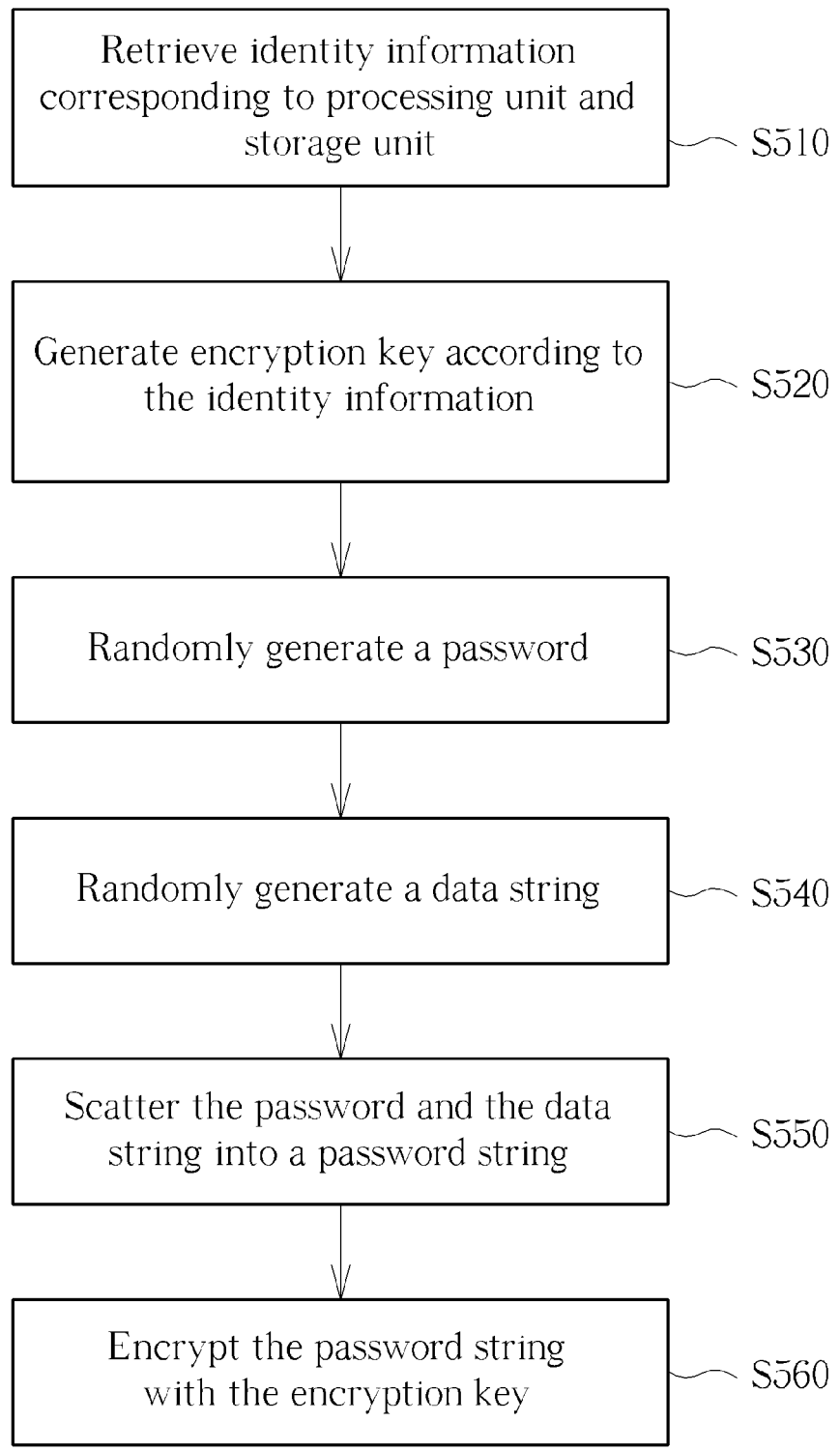
FIG. 5 illustrates a diagram of a method for secure password generation according to an embodiment of the invention.

FIG. 5 illustrates a diagram of a method for secure password generation according to an embodiment of the invention. The method can be applied in an electronic device such as the electronic device 100 shown in FIG. 1. The electronic device comprises among others, a processing unit, and is electrically connected to a storage unit. The storage unit may be internal or external to the electronic device. The processing unit is configured to access data with the storage unit. In step S510, identity information corresponding to the processing unit and the storage unit is retrieved by the processing unit. The identity information is used to generate an encryption key in step S520. The encryption key can be generated by a predetermined algorithm, such as SHA. Then the processing unit randomly generates a password and a data string in step S530 and S540 respectively. The password and the data string may be generated by hardware or software generator. Furthermore, length of the data string may be longer than the password. In one embodiment of the invention, the data string may be N-time longer than the password, wherein N is an integer. In step S550, scatter the password into the data string to produce a password string. Bits/bytes of the password may replace certain bits/bytes of the data string in a predetermined order. For example, replacing every M/Nth bit (byte) of the data string with Nth bit (byte) of the password, in which M is the length of the data string and N is the length of the password. The password string is encrypted with the encryption key in S560 to generate an encrypted password for protecting data file accessed by the processing unit and stored in the storage unit. The password string may be encrypted by predetermined encryption algorithm known in the art.

Figure 6:
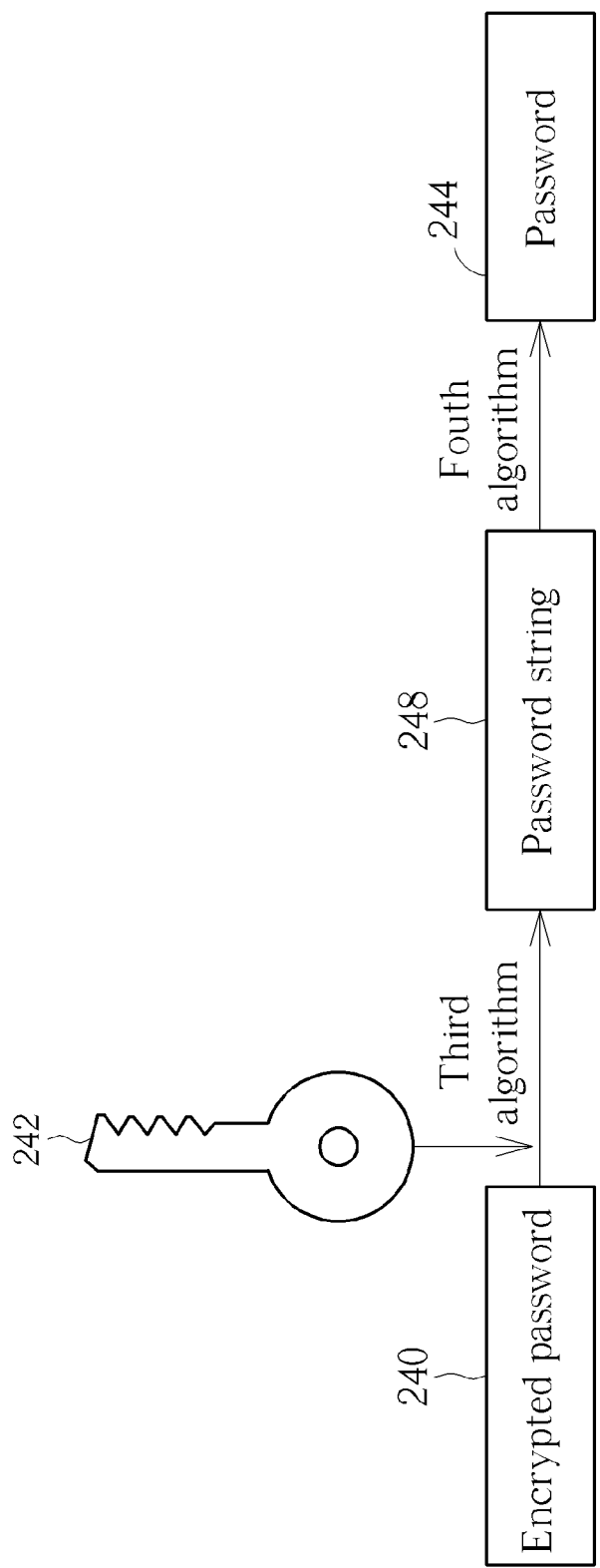
FIG. 6 illustrates an embodiment of the invention for password retrieval from the encrypted password string.

Please refer to FIG. 6 with reference to FIG. 1, the data file 130 and the encrypted password 140 are stored together in the storage unit 120. In response to a request for accessing the data file 130, the encrypted password 140 needs to be decrypted to unlock the data file 130. Otherwise, the data file 130 cannot be accessed. FIG. 6 illustrates a process for decrypting the encrypted password 240 according to an embodiment of the invention. The encrypted password 240 is decrypted by a key 242 according to the third algorithm. As described above, the encrypted password 240 is generated according to the unique information corresponding to the processing unit that processes the data file 130 and the storage unit. In the embodiment of FIG. 1, the encrypted password is generated according to identification data of the processing unit 110 and the storage unit 120. Therefore, the key used to decrypt the encrypted password 240 must be paired with the key used to encrypt the encrypted password 240, which means only processing units that hold the identity information 114 and 124 can generate the key 242. Similarly, the third algorithm used to decrypt the encrypted password is paired with the second algorithm used to encrypt the encrypted password, and thus is hold by authorized processing units.

To derive the password 244, the encrypted password 240 is processed with the key 242 according to the third algorithm to generate a password string 248. The password string 248 is further processed by a fourth algorithm to produce the final password 244. Similarly, the fourth algorithm is paired with the first algorithm. In one embodiment of the invention, these identity information and encryption/decryption algorithms are hold only by the processing unit 110 that processes the data file 130. In this case, no other processing unit or device can unlock the data file 130 since identity information of other unit/device would not match to the first identification data 114 of the first processing unit 110. If the decrypted password 244 matches the password 144 of FIG. 3, the data file 130 can be successfully unlocked. If not, that means the device attempting to access the data file 130 is not the electronic device 100, therefore the data file 130 would remain locked. For example, the electronic device 100 is a phone, the processing unit 110 is an application processor, and the storage unit 120 is a SD card. Data file 130 that is locked by the password 144 generated by the application processor and stored in the SD card cannot be accessed by other phones. As a result, even the SD card is lost, the owner of the phone needs not worry the data file would be accessed by others since it can only be unlocked by the original phone.

Figure 7:
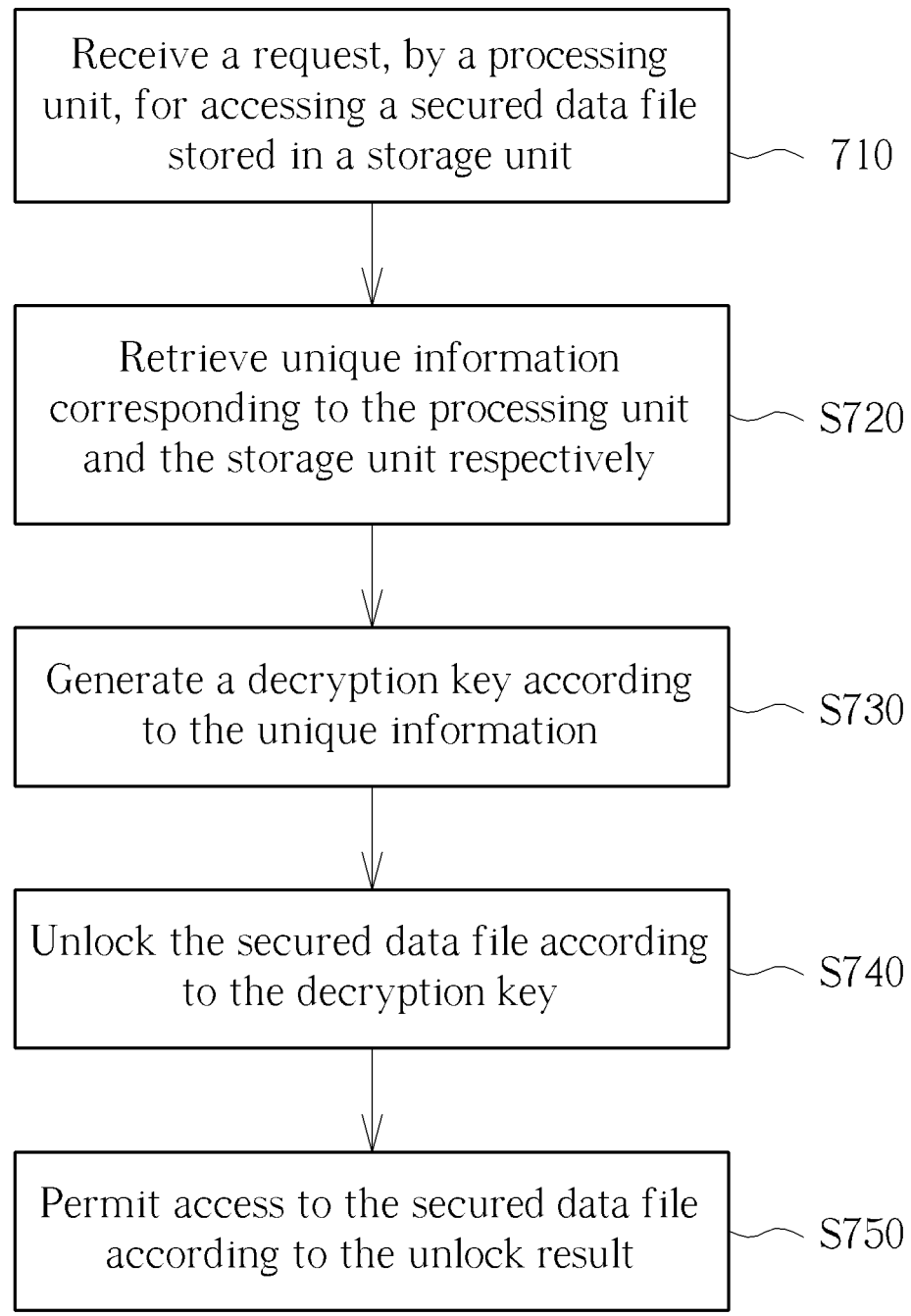
FIG. 7 illustrates a diagram of a method for secure data access according to another embodiment of the invention.

FIG. 7 illustrates a diagram of a method for secure data access according to another embodiment of the invention. In step S710, a processing unit receives a request for accessing a secured data file stored in a storage unit. The secured data file is secured by a password that is also secured by encryption. To unlock the secured data file, step S720 retrieves unique information corresponding to the processing unit and the storage unit respectively. The unique information may be identification data, such as device serial number, IMEI number, MAC address, and/or other suitable information. Then a decryption key is generated according to the unique information in step S730. The decryption key may be generated by processing the identification data by a predetermined algorithm. In one embodiment of the invention, the decryption key may be generated by the process of FIG. 2. In step S740, the secured data file is unlocked according to the decryption key. In one embodiment of the invention, the encrypted password can be decrypted by the process of FIG. 6, and the decrypted password 244 could be used to unlock the secured data file. Then it may be determined whether to permit access to the secured data file according to the unlock result in step S750. In response to the unlocking failure, the secured data file would remain locked from access.

In contrast to the prior art, the present invention provides a method for protecting a password. The password is randomly generated and further hidden in the encrypted random data string, such that the password cannot be easily hacked. Moreover, the password can be automatically obtained only when the storage unit is connected to the original electronic device, and the secured data file, i.e. the locked data file, will not be accessed when the storage unit is connected to other electronic devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method performed on an electronic device for secure data access, comprising:
   retrieving unique information of the electronic device and a storage device directly from the electronic device and the storage device;
   generating an encryption key for encrypting a password string according to the unique information of the electronic device and the storage device;
   randomly generating a password for securing a data file;
   encrypting a password string, which contains the randomly generated password, with the encryption key;
   locking and storing the data file together with the encrypted password string in the storage device;
   unlocking the data file secured with the password in response to a request for accessing the data file by a requesting device, comprising:
      generating a decryption key according to the unique information corresponding to a requesting device and the storage device;
      decrypting the encrypted password string to obtain a decrypted password by the decryption key; and
      unlocking the data file by verifying the decrypted password.

2. The method of claim 1, wherein the step of encrypting the password string further comprises:
   randomly generating a data string; and
   scattering the password and the data string into the password string according to a predetermined algorithm.

3. The method of claim 1, further comprising:
   compressing the data file with at least partial bits of the password string.

4. A data security system, comprising:
   a processing unit, configured to process a data file and retrieve unique information of the processing unit and the storage device directly from the processing unit and the storage device, the processing unit comprising:
      a key generator, configured to generate an encryption key for encrypting a password string according to the unique information of the storage device and the processing unit;
      a password generator, configured to generate a password string containing a randomly generated password for locking the data file, and encrypt the password string containing the randomly generated password according to the encryption key; and
   a storage unit, configured to store the data file and the encrypted password string;
   wherein the data file is locked with the encrypted password string and stored in the storage device;
   wherein the processing unit further comprises a data access interface unit configured to receive a request for accessing the data file, the data file secured with the password being unlocked in response to a request for accessing the data file by a requesting device, the processing unit generating a decryption key according to the unique information corresponding to a requesting device and the storage device, decrypting the encrypted password string to obtain a decrypted password by the decryption key, and unlocking the data file by verifying the decrypted password.

5. The data security system of claim 4, wherein the password string is generated from the password and a data string according to a predefine algorithm.

6. The data security system of claim 5, wherein the password and the data string are generated in random, and the predefined algorithm is a scatter algorithm.

7. The data security system of claim 4, wherein the processing unit is a mobile device, and the storage unit is one of the following: internal storage of the mobile device, external storage device connected to the mobile device, SD memory card, micro SD memory card; and wherein the unique information is selected from one of the following: ID number, serial number, IMEI number, MAC address.

8. The data security system of claim 4, wherein the key generator and the password generator are executed in a secure domain within the processing unit.

9. The data security system of claim 4, wherein the processing unit is further configured to compress the data file prior to storing in the storage unit.

10. A method for secure data access, comprising:
   receiving a request, by a processing unit, for accessing a secured data file stored in a storage unit;
      retrieving unique information of the processing unit and the storage unit directly from the processing unit and the storage unit respectively;
      generating a decryption key for unlocking the secured data file according to the unique information of a requesting device, the processing unit, and the storage unit;
      unlocking the secured data file according to the decryption key; and
      permitting access to the secured data file according to the unlock result;
   wherein the step of unlocking the secured data file comprises:
      decrypting an encrypted password string stored together with the secured data file by the decryption key; and
      obtaining a randomly generated password from the decrypted password string according to a predetermined algorithm;
   verifying the randomly generated password for access the secured data file.

11. The method of claim 10, wherein the step of unlocking the secured data file further comprises decompressing the secured data file.

12. The method of claim 10, wherein in response to the randomly generated password being verified as successful, permitting the processing unit to access the secured data file.

13. The method of claim 10, wherein in response to the randomly generated password being verified as failed, locking the secured data file from accessing.

* * * * *